(12) United States Patent
Sasai

(10) Patent No.: US 10,338,285 B2
(45) Date of Patent: Jul. 2, 2019

(54) BLAZED DIFFRACTION GRATING AND METHOD FOR PRODUCING BLAZED DIFFRACTION GRATING

(71) Applicant: Shimadzu Corporation, Kyoto-shi (JP)

(72) Inventor: Hiroyuki Sasai, Kyoto (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 15/027,898

(22) PCT Filed: Oct. 7, 2013

(86) PCT No.: PCT/JP2013/077206
§ 371 (c)(1),
(2) Date: Apr. 7, 2016

(87) PCT Pub. No.: WO2015/052748
PCT Pub. Date: Apr. 16, 2015

(65) Prior Publication Data
US 2016/0259098 A1 Sep. 8, 2016

(51) Int. Cl.
*G02B 5/18* (2006.01)
(52) U.S. Cl.
CPC ......... *G02B 5/1857* (2013.01); *G02B 5/1852* (2013.01); *G02B 5/1861* (2013.01)
(58) Field of Classification Search
CPC ... G02B 5/1857; G02B 5/1852; G02B 5/1861
(Continued)

(56) References Cited

U.S. PATENT DOCUMENTS 3,942,048 A * 3/1976 Laude ................. G02B 5/1828
250/237 G
2003/0161044 A1* 8/2003 Tokoyoda ............ G02B 5/1847
359/569
(Continued)

FOREIGN PATENT DOCUMENTS

JP 2002-14213 1/2002
JP 2003-084114 A 3/2003
(Continued)

OTHER PUBLICATIONS

International Search Report for PCT/JP2013/077206.
(Continued)

*Primary Examiner* — Collin X Beatty
*Assistant Examiner* — Grant A Gagnon
(74) *Attorney, Agent, or Firm* — Muir Patent Law, PLLC

(57) ABSTRACT

An object is to provide a blazed diffraction grating having a smaller blaze angle than an existing blaze angle, and a method for producing the same. A method for producing a blazed diffraction grating includes the steps of forming a resin layer on a support having a saw-tooth sectional shape and having a surface on which a basic blaze surface and a basic riser surface are arranged alternately and repeatedly in a direction, such that the thickness of the resin layer contacting with the surface monotonically changes in the direction, and forming a metal coating film covering the resin layer surface. The method for monotonically changes the thickness comes in a formation method by difference in volatilization volume after applying a solvent resin on the support, and a formation method by a centrifugal force.

4 Claims, 3 Drawing Sheets

2 PHOTORESIST LAYER
1 SUBSTRATE

3 RESIST PATTERN (PHOTORESIST)
1

(58) Field of Classification Search
USPC .......................................................... 359/571
See application file for complete search history.

(56) References Cited

U.S. PATENT DOCUMENTS

2005/0130072 A1    6/2005  Koeda
2011/0306185 A1*  12/2011  Tsuji ..................... B82Y 20/00
                                                                438/478

FOREIGN PATENT DOCUMENTS

| JP | 2004-240417 A | 8/2004 |
| JP | 4349104 B | 6/2005 |
| JP | 2006-267537 A | 10/2006 |
| JP | 2009-092687 A | 4/2009 |
| WO | 2012/160122 A1 | 11/2012 |

OTHER PUBLICATIONS

Written Opinion of International Search Authority for PCT/JP2013/077206.
Extended European Search Report dated Sep. 27, 2016 in connection with corresponding European Patent Application No. 13895200.7.
EPO communication dated May 29, 2018 for the corresponding European Patent Application No. 13895200.7.
Observations (WO 2012/160122 A1) by a third party concerning the patentability of the invention.

* cited by examiner

BLAZED DIFFRACTION GRATING AND METHOD FOR PRODUCING BLAZED DIFFRACTION GRATING

TECHNICAL FIELD

The present invention relates to a blazed diffraction grating which is a wavelength separation/selection element to be used in a monochromator, a branching filter and the like, and relates to a method for producing the blazed diffraction grating.

BACKGROUND ART

There are various kinds of diffraction gratings. A diffraction grating with grooves having a saw-tooth sectional shape, which is called a blazed diffraction grating, exhibits a high diffraction efficiency for a light of specific wavelength in a range from ultraviolet to visible light, and is often used in a visible light/ultraviolet monochromator and the like (see Patent Literature 1).

Known methods for producing the blazed diffraction grating include an ion beam etching for engraving a substrate by casting ion beams at a predetermined incident angle while using a photoresist as a mask and a machine cutting for forming grooves one by one with a ruling engine. The machine cutting method has a low accuracy in groove interval, and may sometimes leave an uncut chip at a processed edge part, which causes stray light. Therefore, the ion beam etching method is often used in the making of a diffraction grating that requires accuracy.

The method for producing the blazed diffraction grating by the ion beam etching method is described with reference to FIG. 1A to FIG. 1F. First, a photoresist is applied on a surface of a flat substrate 1 of quartz, glass or the like to form a photoresist layer 2 (FIG. 1A). The photoresist layer 2 is exposed under two-beam interference, and interference stripes develop on it, thereby forming a parallel-line shaped resist pattern 3 (holographic exposure) as shown in FIG. 1B. Then, using the resist pattern 3 as a mask, ion beam etching is performed with an oblique beam angle so as to achieve an intended blaze angle qB on the substrate 1 until the resist pattern 3 disappears, whereby a grating groove 4 having a saw-tooth sectional shape is formed on the substrate 1 (FIG. 1C to FIG. 1E). Thereafter, as shown in FIG. 1F, the surface of the grating groove 4 is coated with a metal film 5 of aluminum, gold or the like, and the blazed diffraction grating is completed.

In general, in the above-described etching step, the ion beam etching is performed using an etching gas that gives the etching rate for the substrate 1 higher than the etching rate for the resist pattern 3, that is, yields the selection ratio (=the etching rate for the material (for example, glass) of the substrate/the etching rate for the photoresist) larger than 1.

In this way, a master blazed diffraction grating is produced. On the grating surface of the master diffraction grating, a parting agent layer is formed, and a metal thin film is formed on the parting agent layer. Subsequently, an adhesive on a glass substrate is placed on the metal thin film. After the adhesive is hardened, the glass substrate is separated from the master diffraction grating. In this way, the metal thin film having a grating groove formed is transferred, in a reversed manner, to the glass substrate side, so that a replica diffraction grating is obtained. By using the replica diffraction grating as a master die, diffraction gratings as products are produced (see Patent Literature 1).

As the field of analysis objects of a spectrometer grows, the wavelength of the light to be diffracted by the diffraction grating has become shorter. In order to cope with the shorter diffraction wavelength, it is required to shorten the grating interval and to decrease the blaze angle.

For producing a blazed diffraction grating with a small blaze angle using the above-described ion beam etching method, the incident angle a of the ion beam needs to be large. In this case, as shown in FIG. 2, the riser surface 12 between a blaze surface 11 and an adjacent blaze surface 11 is deeply etched, and the riser surface 12 recedes under the blaze surface 11 (that is, the angle b between the blaze surface 11 and the riser surface is acute), resulting in an eaves-like shape in which the edge of the blaze surface 11 hangs over the adjacent blaze surface 11 (this is called an overhang). A replica diffraction grating cannot be produced with a master diffraction grating having such an overhang.

Further, in the case of a concave diffraction grating, if the incident angle a of the ion beam is too small, a part on the periphery remains unetched. For example, in the case of a concave diffraction grating having the radius R of curvature with the diameter D of the substrate, the edge part of the substrate is curved at an angle of $q=\sin^{-1}(D/2R)$ from the horizontal direction, as shown in FIG. 3. Therefore, when the incident angle a of the ion beam is (90−q) degrees or larger, a part (shadow part) at which the ion beam does not reach the substrate surface remains, where the etching cannot be performed.

CITATION LIST

Patent Literature

[Patent Literature 1] JP 2009-92687 A

SUMMARY OF INVENTION

Technical Problem

An object of the present invention is to provide a blazed diffraction grating having a smaller blaze angle than an existing blaze angle, and a method for producing the same.

Solution to Problem

A blazed diffraction grating according to the present invention, which has been made for achieving the above object, includes:

a) a support having a saw-tooth sectional shape and having a basic blaze surface and a basic riser surface arranged alternately and repeatedly in a direction;

b) a resin layer covering the basic blaze surface and the basic riser surface of the support and having monotonically changing thickness on the basic blaze surface in the direction; and c) a metal coating film covering a surface of the resin layer.

In the blazed diffraction grating according to the present invention, as shown in FIG. 4, on a "resin layer blaze surface" of the resin layer covering the basic blaze surface of the support, the thickness of the resin layer monotonically changes in the direction. Therefore, regardless of the blaze angle qB1 of the basic blaze surface of the support, the blaze angle qB2 of the resin layer blaze surface can be arbitrarily determined. For example, as shown in FIG. 4, when a thickness t1 of the resin layer is larger at a trough portion of the support (i.e. the deeper portion of the basic blaze surface)

and a thickness t2 of the resin layer is smaller at a crest portion of the support (i.e. the shallower portion of the basic blaze surface), the blaze angle qB2 of the resin layer blaze surface can be made to be smaller than the blaze angle qB1 of the basic blaze surface. Conversely, in the case of t1<t2, it is possible to obtain a blazed diffraction grating having a larger blaze angle than the blaze angle qB1 of the basic blaze surface.

The metal coating film is a film that is thin enough to have no influence on the thickness of the resin layer.

A method for producing a blazed diffraction grating according to the present invention, which has been made for achieving the above object, includes the steps of:

a) preparing a support having a saw-tooth sectional shape and having a basic blaze surface and a basic riser surface arranged alternately and repeatedly in a direction;

b) forming a resin layer covering the basic blaze surface and the basic riser surface, on the support, such that a thickness of the resin layer monotonically changes on the basic blaze surface in the direction; and c) forming a metal coating film covering a surface of the resin layer.

The method for forming the resin layer such that the thickness monotonically changes on the basic blaze surface in the direction comes in two methods: a method of utilizing the volatilization of a volatile solvent and a method of utilizing an external force.

The method of utilizing the volatilization of a volatile solvent includes making a solvent resin by dissolving a resin for forming the resin layer in a volatile solvent, applying the solvent resin on the support such that the surface of the solvent resin after the application is flat, and forming the resin layer through a step of volatilizing the volatile solvent and solidifying the resin after the application. In the state in which the solvent resin is applied on the support so that the outermost surface is a flat surface, the depth from the flat surface to the basic blaze surface varies for each part of the basic blaze surface. Therefore, the volume of the volatilization of the solvent from the solvent resin also varies, and after the solidification of the resin, the resin layer blaze surface having different blaze angle from the basic blaze surface is obtained.

The method of utilizing an external force includes giving the external force in the direction when coating the support with a liquid resin for forming the resin layer, and thereby, monotonically changing the thickness of the resin layer coating the basic blaze surface. The external force to be used includes a centrifugal force, a gravitational force by the inclination of the support, a wind force to be applied by an injection of air, or others, to the surface, and the like. The blaze angle of the blazed diffraction grating to be produced can be controlled not only by the control of the intensity of the external force but also by the adjustment of the viscosity of the solvent resin.

Advantageous Effects of Invention

By using the method for producing the blazed diffraction grating according to the present invention, a blazed diffraction grating having any blaze angle can be produced, by a simple production method of forming a resin layer covering a basic blaze surface and a basic riser surface, on a support having a saw-tooth sectional shape and having the basic blaze surface and the basic riser surface arranged alternately and repeatedly in a direction, such that the thickness of the resin layer monotonically changes on the basic blaze surface in the direction, and forming a metal coating film covering a surface of the resin layer. Therefore, it is possible to produce a blazed diffraction grating having a smaller blaze angle than an existing blazed diffraction grating.

DESCRIPTION OF EMBODIMENTS

Hereinafter, modes for carrying out the present invention will be described using embodiments.

[Embodiment 1]

Figure 5:
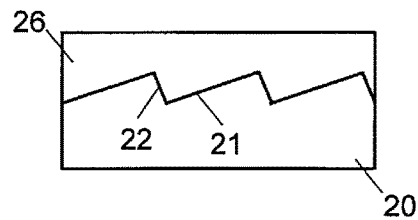
FIG. 5 is a schematic sectional view after solvent resin application in the case where a solvent resin mixed with a volatile solvent is applied on a blazed diffraction grating by dip coating.
Figure 6:
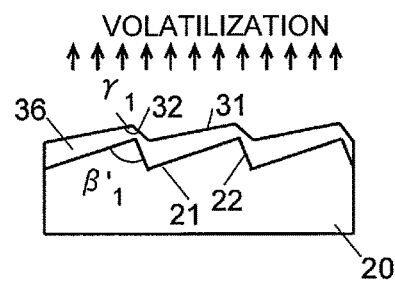
FIG. 6 is a schematic sectional view after the volatilization of the volatile solvent in the case where the solvent resin mixed with the volatile solvent is applied on the blazed diffraction grating by dip coating.

A first embodiment of the present invention will be described with reference to FIG. 5 and FIG. 6. FIG. 5 is a schematic sectional view after solvent resin application in the case where a solvent resin mixed with a volatile solvent is applied on a blazed diffraction grating by dip coating. FIG. 6 is a schematic sectional view after the volatilization of the volatile solvent in the case where the solvent resin mixed with the volatile solvent is applied on the blazed diffraction grating by dip coating.

The first embodiment is an example of the case where a method of utilizing the volatilization of a volatile solvent is used for forming a resin layer such that the thickness monotonically changes on a basic blaze surface in a direction.

In the first embodiment, a blazed diffraction grating 20 having a first blaze angle is used as a support. As an example, in the blazed diffraction grating 20, the number of grooves is 900/mm, the depth of the groove is 0.30 mm, the first blaze angle is 14°, and a master blazed diffraction grating produced by an ion beam etching method is used.

A resin (solvent resin) dissolved in a volatile solvent is applied on a surface of the blazed diffraction grating 20 having multiple grooves each of which is composed of a basic blaze surface 21 and a basic riser surface 22. A dip coating method is used to apply the solvent resin such that the resin surface after the application is flat as shown in FIG. 5. Here, the thickness of the resin layer 26 is, at the thinnest spot (at the part of the crest of the groove), approximately one-half to three times of the groove depth of the blazed diffraction grating 20. The thickness of the resin layer 26 depends also on the proportion of the solvent in the solvent resin. In the case of the blazed diffraction grating 20, the thickness of the solvent resin after the application is about 1 mm at the thickest spot.

Any photo-curing resin and thermosetting resin can be used as the resin in the present invention. As long as the reaction with these resins does not occur, any volatile organic solvent such as ethanol, benzene or acetone can be used as the volatile solvent in the present invention. In the embodiment, ethanol is used as the volatile organic solvent.

Next, the ethanol in the solvent resin is volatilized. The volatilization may be accomplished by heating the whole of the blazed diffraction grating 20 having the solvent resin applied for accelerating the volatilization, or by waiting until the volatile solvent naturally volatilizes with time elapse. As the ethanol in the solvent resin volatilizes as shown by arrows in FIG. 6, the thickness of the solvent resin becomes thinner, and the surface of the solvent resin tends to have a concavo-convex shape which reflects the shape of the grooves of the blazed diffraction grating 20.

Figure 1A:
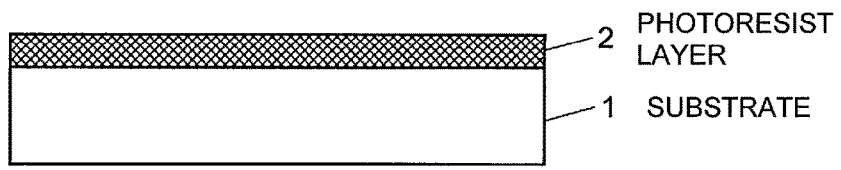
FIG. 1A, FIG. 1B, FIG. 1C, FIG. 1D, FIG. 1E and FIG. 1F are schematic sectional views for describing a procedure of a method for producing a blazed diffraction grating.
Figure 1B:
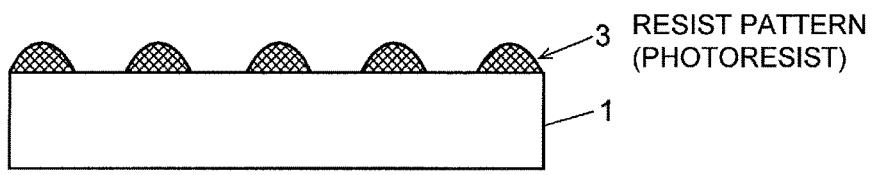
Figure 1C:
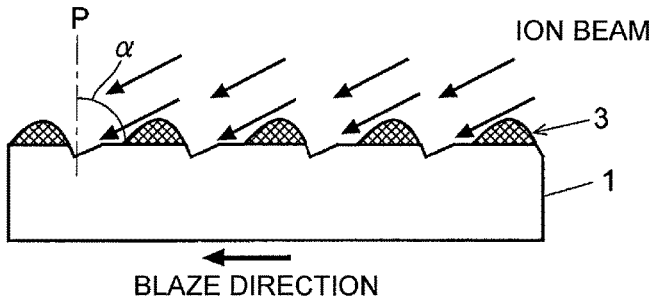
Figure 1D:
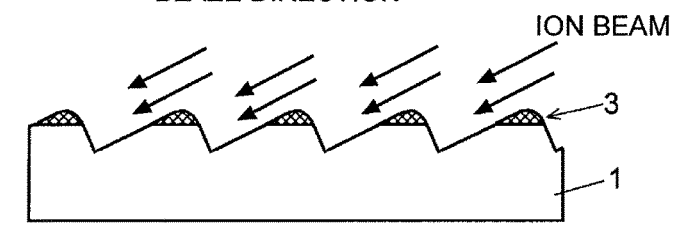
Figure 1E:
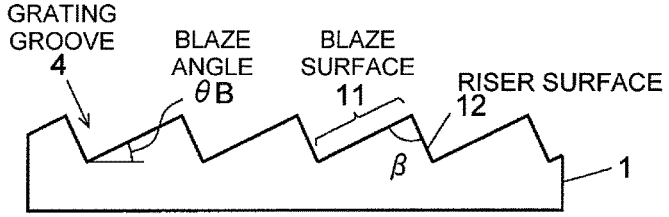
Figure 1F:
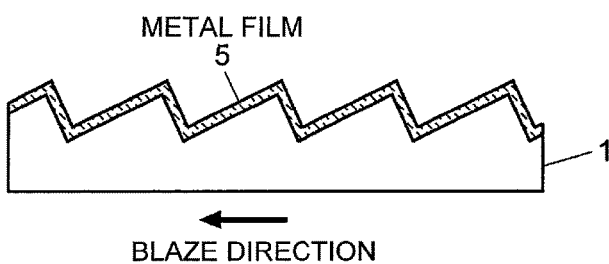
Figure 2:
FIG. 2 is a diagram for describing an overhang.
Figure 3:
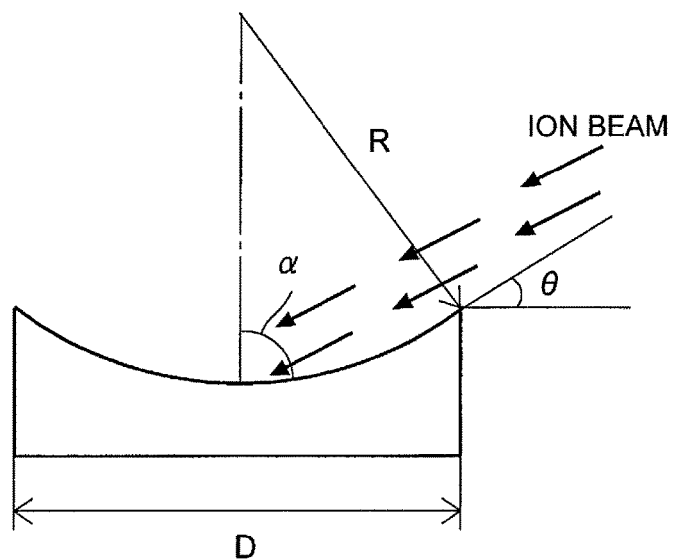
FIG. 3 is a diagram for describing a curve of an edge part of a substrate in the case of a concave diffraction grating.
Figure 4:
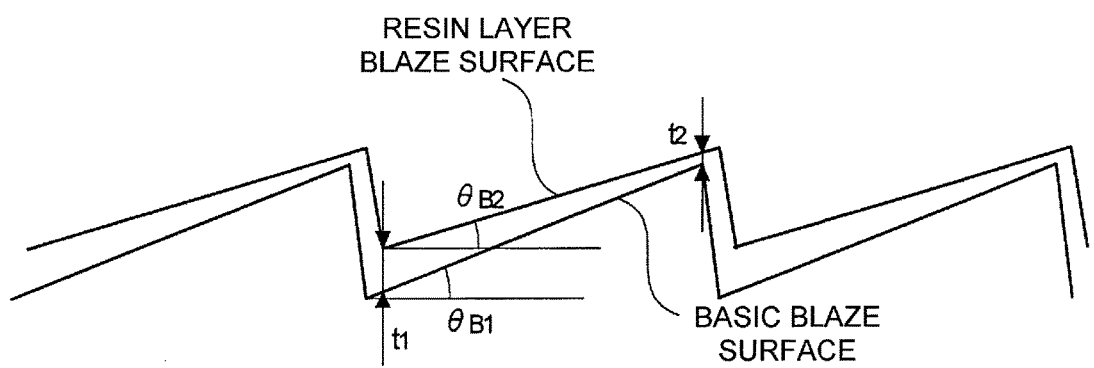
FIG. 4 is a diagram for describing a change in blaze angle.

Thereafter, the resin is solidified by a predetermined method, so that a resin layer 36 having the concavo-convex shape which reflects the shape of the grooves of the blazed diffraction grating 20 is formed on the surface of the blazed diffraction grating 20 as shown in FIG. 6. Here, the thickness of the resin layer 36 is not uniform, and monotonically changes on the basic blaze surface 21 in a direction, and the thickness (t2 in FIG. 4) on the crest (the convex part of the concavo-convex shape) of the blazed diffraction grating 20 is smaller than the thickness (t1 in FIG. 4) on the trough (the concave part of the concavo-convex shape) of the blazed diffraction grating 20. As a result, the groove of the resin layer 36 is shallower than the groove of the blazed diffraction grating 20. In the above-described example, the thickness of the resin layer 36 is approximately 100 nm to 200 nm at the thinnest spot.

The reason why the thickness of the resin layer 36 is not uniform and the thickness on the crest of the blazed diffraction grating 20 is smaller than the thickness on the trough of the blazed diffraction grating 20 is thought to be as follows. As shown in FIG. 5, in the dip coating method of performing the resin application such that the resin surface after the application is flat, the thickness of the solvent resin after the application is thinner on the crest of the blazed diffraction grating 20, and is thicker on the trough of the blazed diffraction grating 20. The proportion of the volatile solvent contained in the solvent resin is even, and therefore, assuming that the solvent resin volatilizes by a constant proportion (for example, half) of the thickness immediately after the application of the solvent resin, film thickness is reduced by the constant proportion while the relation of the thickness of the solvent resin after the above application is maintained. As a result, the thickness of the resin layer 36 is not uniform, and the thickness on the crest of the blazed diffraction grating 20 is smaller than the thickness on the trough of the blazed diffraction grating 20.

Thereafter, for protecting the surface of the resin layer 36, a metal coating film of aluminum or the like, which is not illustrated, is formed on the surface using a vacuum evaporation method, a sputtering method or the like, and the production of the blazed diffraction grating is completed. The thickness of the metal coating film is approximately several tens nanometers, which has no influence on the shape of the surface of the resin layer 36.

The resin layer 36 has a blaze surface 31 on the basic blaze surface 21 and a riser surface 32 on the basic riser surface 22, and the slopes of the blaze surface 31 and riser surface 32 are more gradual than the slopes of the basic blaze surface 21 and basic riser surface 22, respectively. The angle $g_1$ between the blaze surface 31 and the riser surface 32 is larger than the angle $b'_1$ between the basic blaze surface 21 and the basic riser surface 22. The blaze angle (second blaze angle) of the blazed diffraction grating produced in this way is smaller than the blaze angle (first blaze angle) of the blazed diffraction grating 20. The above-described example gives a blazed diffraction grating in which the number of grooves is 900/mm, the depth of the groove is 0.15 mm and the second blaze angle is 7°.

In the embodiment, by utilizing the unevenness of the thickness of the residual resin layer due to the even volatilization of the solvent from the solvent resin whose thickness is uneven, the resin layer is formed such that the resin layer monotonically changes on the basic blaze surface of the blazed diffraction grating 20, which is the support, in the direction and the thickness of the resin layer on the crest of diffraction grating 20 is smaller than the thickness on the trough of the blazed diffraction grating 20, whereby the blaze angle of the produced blazed diffraction grating is made to be smaller than that of the blazed diffraction grating 20 used as the support. Therefore, it is possible to produce a blazed diffraction grating having a small blaze angle, which is difficult to achieve by the conventional methods for producing the diffraction grating.

In the case where the blaze angle of the produced blazed diffraction grating is not an intended angle, it is only necessary to remove the formed resin layer and redo the formation of the resin layer. Therefore, even if the processing is unsuccessful, the processing object material does not need to be discarded, leading to the reduction in production cost.

[Embodiment 2]

Figure 7:
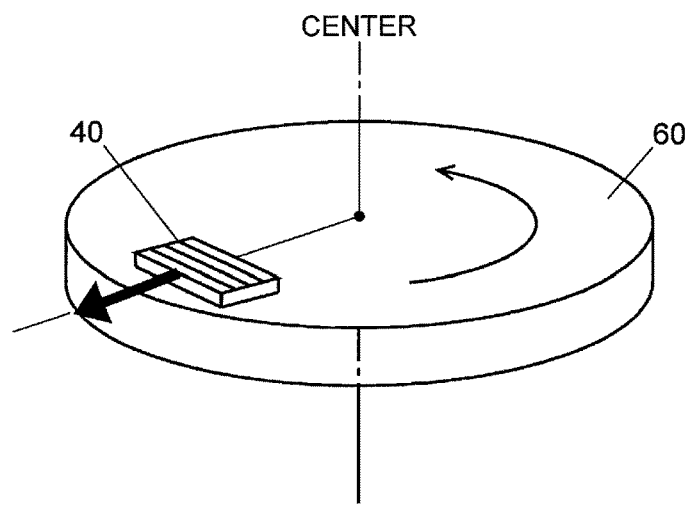
FIG. 7 is a simplified schematic view of a unit that gives a centrifugal force.
Figure 8:
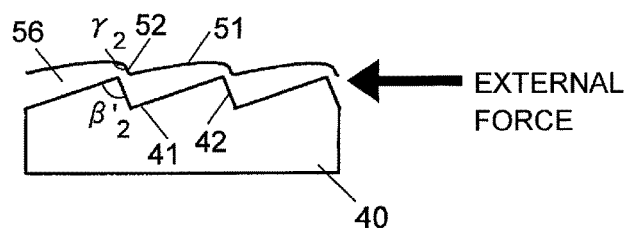
FIG. 8 is a schematic sectional view of a liquid resin on a blazed diffraction grating when the centrifugal force is applied.

A second embodiment of the present invention will be described with reference to FIG. 7 and FIG. 8. FIG. 7 is a simplified schematic view of a unit for giving a centrifugal force. FIG. 8 is a schematic sectional view of a liquid resin on a blazed diffraction grating 40 when the centrifugal force is applied. In the following description of the second embodiment, a liquid resin is used. A resin liquefied by the same volatile solvent as that in the first embodiment may be used. Hereinafter, descriptions that are the repetition of the first embodiment is omitted, and differences from the first embodiment is mainly described.

The second embodiment is an example of the case where a method of utilizing an external force is used for forming a resin layer such that the thickness monotonically changes on a basic blaze surface in a direction, and a centrifugal force is used as the external force.

In the second embodiment, a liquid resin is applied on a surface of a blazed diffraction grating 40 that is a support and that has multiple grooves each of which is composed of a basic blaze surface 41 and a basic riser surface 42. The application of the liquid resin may be done by any method, such as a dip method and a centrifugation method (spin coating). In the case of the spin coating, the spin speed is not to be very high, and the coating thickness needs to be sufficiently large.

The blazed diffraction grating 40 is set on a centrifugal apparatus such that a centrifugal force is applied, in the blaze direction (the direction perpendicular to the groove), to the blazed diffraction grating 40 having the liquid resin applied on the surface. Specifically, as shown in FIG. 7, the blazed diffraction grating 40 is fixed at a peripheral part that is as far away from the center of a discoid rotating plate 60 as possible. At this time, the blazed diffraction grating 40 is fixed such that the blaze direction coincides with the radial direction of the rotating plate 60. If a resin layer having a smaller blaze angle than the blaze angle of the basic blaze surface 41 is desired, the blazed diffraction grating 40 is fixed such that the basic blaze surface 41 is oriented to the outer side of the rotating plate 60. Conversely, if a resin layer having a larger angle than the blaze angle of the basic blaze surface 41 is desired, the basic blaze surface 41 is oriented to the center of the rotating plate 60. For the fixation, preferably, a conductive adhesive or tape (for example, a copper tape or the like) should be used, in order to release static electricity toward the rotating plate 60 when the blazed diffraction grating 40 is charged.

Next, the rotating plate 60 is rotated at a high speed of several thousand rpms to apply a force (centrifugal force), in the blaze direction, to the liquid resin on the surface of the blazed diffraction grating 40 (an arrow in FIG. 8). In this way, the liquid resin flows on the basic blaze surface 41. As described above, in the case where the basic blaze surface 41 is oriented to the outer side, the blaze angle of a resin layer 56 becomes smaller than that of the basic blaze surface 41, and in the case where the basic blaze surface 41 is oriented to the center side, the blaze angle of the resin layer 56 becomes larger than that of the basic blaze surface 41.

Through such a high-speed rotation, the liquid resin is naturally solidified. The solidification may be further accelerated by the light casting to the rotating surface or the heating of the rotating plate 60.

In such steps, by solidifying the liquid resin while giving the centrifugal force to the liquid resin, the resin layer 56 reflecting the shape of the grooves of the blazed diffraction grating 40 and having a different blaze angle from the blazed diffraction grating 40 is formed on the surface of the support.

Thereafter, as a metal coating film covering the surface of the resin layer 56, which is not illustrated, aluminum is formed (for example, the thickness is several tens nanometers) using a vacuum evaporation method, a sputtering method or the like while the blaze shape of the resin layer 56 is maintained, and the blazed diffraction grating is completed.

In FIG. 8, the resin layer 56 has a blaze surface 51 on the basic blaze surface 41 and a riser surface 52 on the basic riser surface 42, and the slopes of the blaze surface 51 and riser surface 52 are more gradual than the slopes of the basic blaze surface 41 and basic riser surface 42, respectively. Therefore, the angle $g_2$ between the blaze surface 51 and the riser surface 52 is larger than the angle $b'_2$ between the basic blaze surface 41 and the basic riser surface 42.

In the embodiment, the resin layer is formed such that the resin layer monotonically changes on the basic blaze surface of the blazed diffraction grating 40, which is the support, in the direction and the thickness (t2 in FIG. 4) of the resin layer on the crest of the blazed diffraction grating 40 is smaller than the thickness (t1 in FIG. 4) on the trough of the blazed diffraction grating 40, whereby the blaze angle of the produced blazed diffraction grating is made to be smaller than the blaze angle of the blazed diffraction grating 40 used as the support. Therefore, it is possible to produce a blazed diffraction grating having a small blaze angle, which is difficult to achieve by the conventional methods for producing the diffraction grating.

In the case where the blaze angle of the produced blazed diffraction grating is not an intended angle, it is only necessary to remove the formed resin layer and redo the formation of the resin layer. Therefore, even if the processing is unsuccessful, the processing object material does not need to be discarded, leading to the reduction in production cost.

By using the present embodiment, the blaze angle of the blazed diffraction grating to be produced can be controlled by controlling the rotation speed of the rotating plate 60 or adjusting the viscosity of the liquid resin to be applied. The adjustment of the viscosity of the liquid resin may be performed by mixing the volatile solvent mentioned in Embodiment 1. Therefore, the flexibility for adjusting the parameter in the production stage for the blazed diffraction grating is high.

The embodiment shows an example in which a centrifugal force is used as the external force to be given to the liquid resin, but the present invention is not limited to this. As an example, the support having the liquid resin applied may be inclined such that a gravitational force is given in the direction shown by the arrow in FIG. 8. Further, a wind force may be used as the external gas, by injecting inert gas such as nitrogen gas or air in the direction shown by the arrow in FIG. 8.

The above embodiments show an example in which the master diffraction grating is used as the blazed diffraction grating to be used for the support, but the present invention is not limited to this. As the blazed diffraction grating to be used for the support, a replica diffraction grating may be used. Further, from the blazed diffraction grating produced in the above embodiment, a replica diffraction grating can be produced.

REFERENCE SIGNS LIST

1 . . . Substrate
2 . . . Photoresist Layer
3 . . . Resist Pattern
4 . . . Grating Groove
5 . . . Metal Film
20, 40 . . . Blazed Diffraction Grating
21, 41 . . . Basic Blaze Surface
11, 31, 51 . . . Blaze Surface
22, 42 . . . Basic Riser Surface
12, 32, 52 . . . Riser Surface
26, 36, 56 . . . Resin Layer
60 . . . Rotating Plate

The invention claimed is:
1. A blazed diffraction grating comprising:
   a) a support having a saw-tooth sectional shape and having a basic blaze surface and a basic riser surface arranged alternately and repeatedly in a direction;
   b) a resin layer covering the basic blaze surface and the basic riser surface of the support and having monotonically changing thickness on the basic blaze surface in the direction; and
   c) a reflective metal coating film covering a surface of the resin layer,
   wherein a blaze angle of the resin layer on the basic blaze surface is smaller than a blaze angle of the basic blaze surface, and
   wherein a thickness of the resin layer is 100 nm to 200 nm at a thinnest spot of the resin layer.
2. A method for producing a blazed diffraction grating comprising the steps of:
   a) preparing a support having a saw-tooth sectional shape and having a basic blaze surface and a basic riser surface arranged alternately and repeatedly in a direction;
   b) forming a resin layer covering the basic blaze surface and the basic riser surface, on the support, such that a thickness of the resin layer monotonically changes on the basic blaze surface in the direction, wherein a blaze angle of the resin layer on the basic blaze surface is smaller than a blaze angle of the basic blaze surface, and a thickness of the resin layer is 100 nm to 200 nm at a thinnest spot of the resin layer; and c) forming a reflective metal coating film covering a surface of the resin layer.

3. The method for producing the blazed diffraction grating according to claim 2, wherein the step of forming the resin layer such that the thickness of the resin layer monotonically changes in the direction comprises the steps of:

d) making a solvent resin, by dissolving a resin composing the resin layer in a volatile solvent;

e) applying the solvent resin on the support such that a surface of the solvent resin after the application is flat; and f) volatilizing the volatile solvent and solidifying the resin, after the application.

4. The method for producing the blazed diffraction grating according to claim 2, wherein the step of forming the resin layer such that the thickness of the resin layer monotonically changes in the direction comprises the steps of:

d) applying a liquid resin composing the resin layer, on the support; and e) solidifying the liquid resin while giving a centrifugal force to the liquid resin.

\* \* \* \* \*